Figure 1:
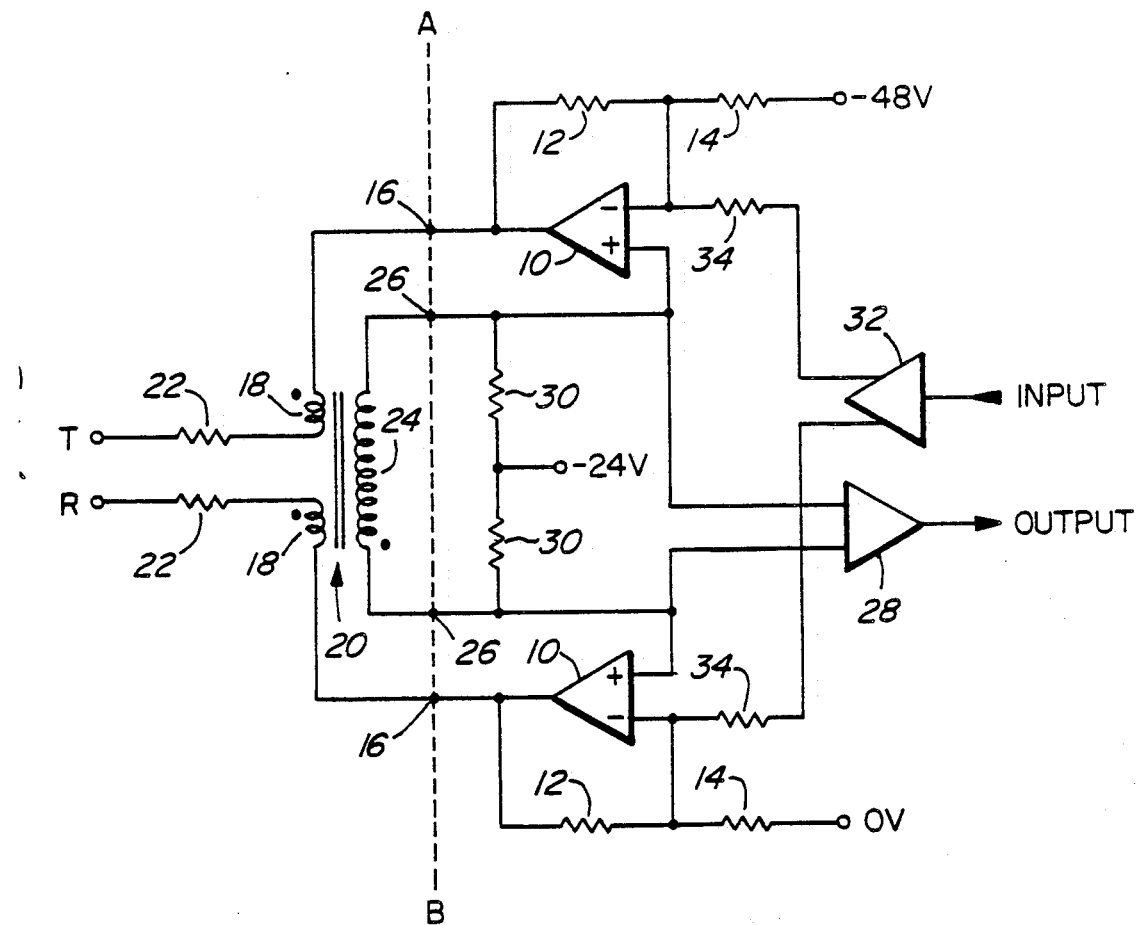

United States Patent [19]
Jakab

[11] Patent Number: 4,993,064
[45] Date of Patent: Feb. 12, 1991

[54] SUBSCRIBER LINE INTERFACE CIRCUIT AND TRANSFORMER THEREFOR NORTHERN TELECOM LIMITED

[75] Inventor: Gyula Jakab, Ontario, Canada

[73] Assignee: Northern Telecom Limited, Montreal, Canada

[21] Appl. No.: 326,448

[22] Filed: Mar. 22, 1989

Related U.S. Application Data

[63] Continuation of Ser. No. 61,593, Jun. 15, 1987, abandoned.

[51] Int. Cl.$^5$ ............... H01F 27/28; H04M 19/00
[52] U.S. Cl. ............... 379/413; 336/222; 379/399
[58] Field of Search ............... 379/324, 413, 405, 345, 379/400, 399, 398; 336/206, 222, 177; 323/356, 357, 358, 359

[56] References Cited

U.S. PATENT DOCUMENTS

| | | | |
|---|---|---|---|
| 1,869,914 | 8/1932 | Round | 336/222 |
| 3,464,002 | 8/1969 | Hentschel | 336/222 X |
| 4,238,644 | 12/1980 | Dijkmans et al. | 379/413 |
| 4,258,467 | 3/1981 | Witte | 336/206 X |
| 4,484,032 | 11/1984 | Rosenbaum | 379/345 |

Primary Examiner—Jin F. Ng
Assistant Examiner—Randall S. Vaas
Attorney, Agent, or Firm—Dallas F. Smith

[57] ABSTRACT

In a SLIC in which loop current is supplied via active circuits, feed resistances via which the active circuits are conventionally coupled to the line are constituted by bifilar resistance wire windings of a ferrite core transformer, which may include a third winding coupled to an input of the active circuits.

11 Claims, 1 Drawing Sheet

SUBSCRIBER LINE INTERFACE CIRCUIT AND TRANSFORMER THEREFOR NORTHERN TELECOM LIMITED

This is a continuation of application Ser. No. 061,593 filed June 15, 1987, now abandoned.

This invention relates to line circuits for two-wire communication lines, and to transformers suitable for use in such line circuits.

It is a well-known problem in the art of two-wire line circuits, such as telephone subscriber line interface circuits (SLICs), to provide a termination of the line which meets a number of criteria relating to such matters as a.c. and d.c. impedances, balance with respect to ground, tolerance to induced longitudinal currents and fault and ringing conditions, supply of loop current, and so on.

In the development of line circuits, it has become common to provide active circuits, such as differential voltage amplifiers and constant current circuits, for passing direct (loop) current on the line, outputs of the active circuits being coupled to the line wires via feed resistors. As is well known, such feed resistors must be closely matched and capable of dissipating a significant power in order to satisfy the various criteria. Accordingly, the feed resistors are generally provided as laser-trimmed thick film resistors and constitute a substantial part of the cost of a line circuit, most of the remainder of which can be provided in the form of one or more integrated circuit devices.

In order to improve line circuits, it is also known, for example from Rosenbaum U.S. Pat. No. 4,484,032 issued Nov. 20, 1984 and entitled "Active Impedance Transformer Assisted Line Circuit", to provide a small transformer with two similar primary windings which are coupled in series with the d.c. feed resistors and a secondary winding which is coupled to an input of the active circuits.

An object of this invention is to provide an improved line circuit for a two-wire communication line.

According to one aspect of this invention there is provided a line circuit for a two-wire communication line, comprising: two terminals for connection to the line; two active circuits for passing direct current on the line; and two resistive feed means each coupled between an output of a respective one of the active circuits and a respective one of the terminals; wherein each resistive feed means is constituted substantially entirely by a resistive winding of a transformer.

Thus in accordance with this invention the feed resistors of the prior art line circuits are replaced by transformer windings which are deliberately made resistive to provide all of the desired d.c. feed resistance.

In order to provide a fully balanced line circuit, preferably the resistive windings comprise substantially identical, for example bifilar, windings of a single transformer. In order to provide the advantages of the arrangements described in the Rosenbaum patent mentioned above, the line circuit preferably includes a third winding of the transformer coupled to an input of the active circuits.

The transformer conveniently comprises a ferrite core, and each resistive winding preferably comprises a winding of resistance wire.

The term "resistance wire" is used herein to mean a wire or conductor which is deliberately selected, in consideration of its material and size, to provide a desired resistance per unit length (linear resistance) or number of turns in the transformer, as distinct from a wire or conductor, for example of copper of substantial gauge, which inevitably has some resistance but in which this resistance is essentially undesired. Thus the resistance wire could conceivably be a copper wire of sufficiently fine gauge to provide a desired linear resistance, but generally will be of a material, for example an alloy of copper and nickel, which is selected for its resistive properties.

According to another aspect this invention provides a line circuit comprising a transformer having two substantially identical windings comprising resistive wire, and two active circuits each coupled to a respective one of said windings for passing direct current on a two-wire communication line, the windings providing substantially all of a direct current feed resistance of the line circuit.

Following from the above aspects, in accordance with a further aspect of this invention there is provided a transformer comprising two substantially identical windings of resistance wire each for providing a predetermined resistance, and a third winding magnetically coupled to said two windings and having a predetermined turns ratio with respect to said two windings.

Preferably the predetermined resistance is in a range from about 10 ohms to about 200 ohms, and particularly may be about 100 ohms. The two windings are preferably bifilar windings, and the transformer preferably has a ferrite core.

The third winding may be, but generally will not be, of resistance wire.

Figure 2:
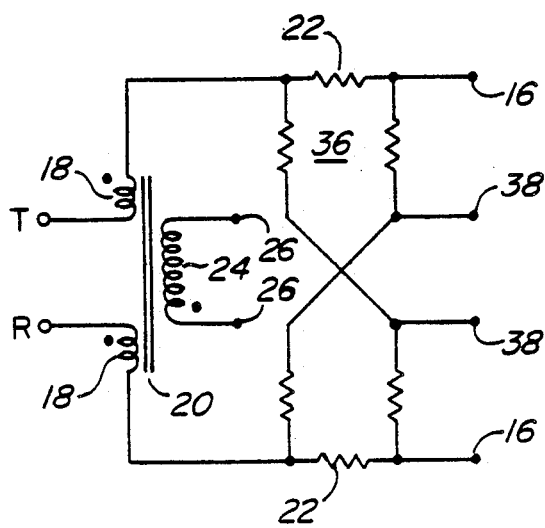
Figure 3:
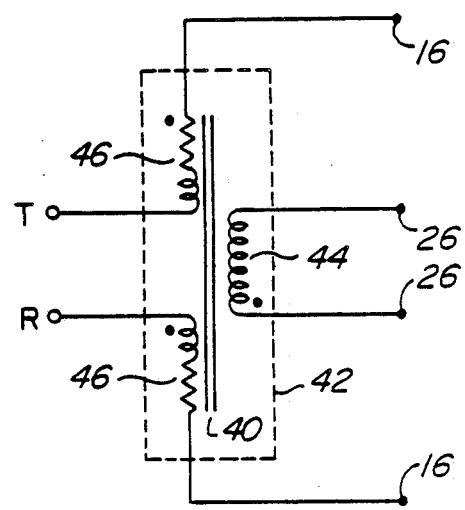

The invention will be further understood from the following description with reference to the accompanying drawings, in which:

FIG. 1 schematically illustrates a known form of telephone subscriber line interface circuit (SLIC);

FIG. 2 schematically illustrates parts of an alternative known form of SLIC; and FIG. 3 schematically illustrates a transformer, constituting parts of a SLIC, in accordance with this invention.

Referring to FIG. 1, there is illustrated therein a SLIC having a form known from Rosenbaum U.S. Pat. No. 4,484,032 issued Nov. 20, 1984 and entitled "Active Impedance Transformer Assisted Line Feed Circuit". As is known in the art, in such a SLIC differential amplifiers 10 having negative feedback resistors 12 and bias resistors 14 have output terminals 16 coupled to terminals T and R, and hence to the tip and ring wires of a two-wire telephone subscriber line connected thereto, via primary windings 18 of a transformer 20 and via feed resistors 22 connected in series with the primary windings 18. The transformer 20 also has a secondary winding 24 whose terminals 26 are connected to non-inverting inputs of the amplifiers 10, to differential inputs of a four-wire output amplifier 28, and via resistors 30 to a bias potential. A four-wire input amplifier 32 has differential outputs connected via resistors 34 to inverting inputs of the amplifiers 10.

Dots adjacent the windings 18 and 24 of the transformer 20 illustrate the senses of the windings. Parts of the SLIC shown to the right of a broken line AB in FIG. 1 may be conveniently provided in integrated circuit form. The manner in which such a SLIC operates is known in the art and from the above patent and need not be described here.

As is known, the feed resistors 22 must be closely matched, to a tolerance of the order of 0.1%, and also must be capable of dissipating a substantial amount of power. To these ends, the feed resistors 22 generally take the form of laser-trimmed thick-film resistors, and have a relatively high cost of manufacturing in relation to the cost of the entire SLIC.

FIG. 2 illustrates an alternative arrangement, also known from the above patent, in which the relative positions of the primary windings 18 and feed resistors 22 are reversed, and a resistance network 36 comprising cross-connected voltage dividers is provided to produce at terminals 38 a differential voltage for amplification in known manner in the remainder of the SLIC, not shown in FIG. 2. The parts shown in FIG. 2 correspond to parts of the arrangement of FIG. 1 to the left of the broken line AB. Again in FIG. 2 the feed resistors 22 must be closely matched, as must be the resistors of the resistance network 36, so that these are generally all thick-film resistors on a common substrate.

The invention is described below with reference to FIG. 3 in relation to its application to the specific circuit arrangement of FIG. 1, but it should be appreciated that it is equally applicable to alternative arrangements such as that of FIG. 2.

Referring to FIG. 3, in accordance with the invention the transformer 20 and feed resistors 22 of FIG. 1 are replaced by a transformer 40, shown within a broken line box 42 in FIG. 3. The transformer 40 comprises a secondary winding 44, corresponding to the secondary winding 24 of the transformer 20 in FIG. 1 and coupled to the terminals 26, and two primary windings 46 which are connected in series between the terminals 16 and the terminals T and R. Dots in FIG. 3 illustrate the senses of the windings 44 and 46, as in FIG. 1.

In FIG. 3, the primary windings 46 perform not only the inductive and transforming function of the windings 18 in FIG. 1, but also the resistive function of the feed resistors 22 in FIG. 1. To this end, these windings 46 are constituted by resistance wire and are represented schematically in FIG. 3 as having both resistive and inductive components.

In the arrangement of FIG. 3, it remains necessary for the windings 46 and the resistances thereof to be closely matched. To this end, these windings 46 are bifilar-wound from equal lengths of resistance wire. This is most conveniently achieved using resistance wire such as that designated No. 60 available from MWS Wire Industries of Westlake Village, Calif. in the form of paired wires, such resistance wire having a resistance of about 6.24 ohms per foot (20.5 ohms per meter). However, any other form of resistance wire, of suitable gauge and linear resistance to provide a desired resistance for a desired number of turns, may be used to suit any particular application.

By way of example, it is observed that the transformer 40 may comprise a ferrite core having a type and size from that designated RM4 (occupying an approximately cubic volume with a side of about 0.35 inches or 9 mm.) to that designated RM8 (occupying an approximately cubic volume with a side of about 0.75 inches or 19 mm.). Such cores can accommodate at least about one thousand turns of 40 gauge or finer wire, so that the number of turns of, and the turns ratio between, the windings 44 and 46 can be arbitrarily selected in known manner. For example, each of the windings 46 may conveniently comprise 100 turns, and the number of turns of the winding 44 (which is of conventional, copper, wire) may be determined by the desired turns ratio. The gauge and material of the wire used for the windings 46 is selected to provide a desired resistance for each winding, which typically may be 100 ohms but which can alternatively be within a wide range of resistances, for example 10 to 200 ohms.

As the cost of resistance wire is not significantly greater than that of ordinary copper wire, it should be appreciated from the above description that the transformer 40 can be provided at a similar cost to that of the transformer 20, whereby the invention enables substantially all of the manufacturing costs associated with the thick film resistors 22 to be avoided. Furthermore, the transformer 40, while being of a small size, is nevertheless of sufficient size to satisfy power dissipation requirements without undergoing an excessive increase in temperature.

Although the invention has been described in relation to a SLIC which already includes the transformer 20, it should also be appreciated that the secondary winding 24 or 44 is not necessarily involved in or affected by the invention. Accordingly, the invention is equally applicable to other forms of line interface circuit which do not require the use of a transformer, the invention being applied to such circuits in that the feed resistors are replaced by a transformer such as that described above, with primary windings of resistance wire, but without any secondary winding 44.

Numerous other modifications, variations, and adaptations may be made to the particular embodiment of the invention described above without departing from the scope of the claims.

What is claimed is:

1. A line circuit for a two-wire communication line, comprising:
    two terminals for connection to the line;
    two active circuits for passing direct current on the line;
    and two resistive feed means each coupled between an output of a respective one of the active circuits and a respective one of the terminals;
    wherein each resistive feed means is constituted substantially entirely by a winding of resistance wire of a transformer, and there is substantially no other resistance in series with each winding of resistance wire between the output of the respective one of the active circuits and the respective one of the terminals.

2. A line circuit as claimed in claim 1 wherein the resistive windings comprise substantially identical windings of a single transformer.

3. A line circuit as claimed in claim 2 and including a third winding of the transformer coupled to an input of the active circuits.

4. A line circuit as claimed in claim 3 wherein the resistive windings are bifilar windings.

5. A line circuit as claimed in claim 4 wherein the transformer comprises a ferrite core.

6. A line circuit comprising a transformer having two substantially identical windings comprising resistance wire, and two amplifier circuits each coupled to a respective one of said windings for passing direct current on a two-wire communication line, the windings providing substantially all of a direct current feed resistance of the line circuit.

7. A transformer comprising two substantially identical windings of resistance wire each for providing a predetermined resistance, and a third winding magnetically coupled to said two windings and having a predetermined turns ratio with respect to said two windings.

8. A transformer as claimed in claim 7 wherein the predetermined resistance is in a range from about 10 ohms to about 200 ohms.

9. A transformer as claimed in claim 7 wherein the predetermined resistance is about 100 ohms.

10. A transformer as claimed in claim 7 wherein the two substantially identical windings are bifilar windings.

11. A transformer as claimed in claim 7 and having a ferrite core.

* * * * *